(12) United States Patent  
Chan et al.

(10) Patent No.: US 8,713,356 B1
(45) Date of Patent: Apr. 29, 2014

(54) ERROR DETECTION AND RECOVERY TOOL FOR LOGICAL VOLUME MANAGEMENT IN A DATA STORAGE SYSTEM

(75) Inventors: Hwai-Yeng Chan, Cary, NC (US); Sateesh Pallapothu, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 271 days.

(21) Appl. No.: 13/225,356

(22) Filed: Sep. 2, 2011

(51) Int. Cl.
*G06F 11/00* (2006.01)

(52) U.S. Cl.
USPC .......................................................... 714/6.1

(58) Field of Classification Search
USPC .......................................................... 714/6.1
See application file for complete search history.

(56) References Cited

U.S. PATENT DOCUMENTS

| | | |
|---|---|---|
| 5,758,149 A | 5/1998 | Bierma et al. |
| 5,828,876 A | 10/1998 | Fish et al. |
| 5,890,204 A | 3/1999 | Ofer et al. |
| 5,987,621 A | 11/1999 | Duso et al. |
| 6,240,511 B1 | 5/2001 | Blumenau et al. |
| 6,643,722 B1 | 11/2003 | Scaringella et al. |
| 6,687,787 B1 | 2/2004 | Richardson et al. |
| 6,745,286 B2 | 6/2004 | Staub et al. |
| 6,990,601 B1 | 1/2006 | Tsuneya et al. |
| 7,051,050 B2 | 5/2006 | Chen et al. |
| 7,219,260 B1 | 5/2007 | de Forest et al. |
| 7,373,364 B1 | 5/2008 | Chapman |
| 7,555,569 B1 | 6/2009 | O'Hare |
| 7,609,651 B1 | 10/2009 | McBride et al. |
| 7,716,684 B2 | 5/2010 | Singhal et al. |
| 7,831,769 B1 * | 11/2010 | Wen et al. ............... 711/114 |
| 7,971,091 B1 | 6/2011 | Bingham et al. |
| 7,984,131 B1 | 7/2011 | Gandhi |
| 8,095,764 B1 | 1/2012 | Bauer et al. |

(Continued)

FOREIGN PATENT DOCUMENTS

| | | |
|---|---|---|
| WO | 2010/016239 A1 | 1/2010 |
| WO | 2010/122604 A1 | 10/2010 |
| WO | 2012/131868 A1 | 10/2012 |

OTHER PUBLICATIONS

EMC Storage Configuration Advisor, Data Sheet, Jan. 2011, 3 pages, EMC Corporation, Hopkinton, MA.

(Continued)

*Primary Examiner* — Michael Maskulinski
*Assistant Examiner* — Neil Miles
(74) *Attorney, Agent, or Firm* — Richard Auchterlonie; Novak Druce Connolly Bove + Quigg LLP

(57) ABSTRACT

Errors arising in logical volume partitions are detected and corrected automatically well before the errors cause a failure to access data. A database is created of configuration information about the logical volume partitions defined in physical volume headers, and the database is stored in storage separate from the headers. Thereafter the errors are detected by capturing configuration information about the logical volume partitions from the headers, and comparing the captured configuration information to the configuration information in the database. The errors are automatically corrected in the corrupt headers. If requested, a report is generated of the volumes and disk partitions that are inaccessible or missing or have the wrong size. The configuration check is performed periodically as a background task and during a re-boot after a system crash or interruption of a configuration process or when invoked prior to a recovery install or database restore.

8 Claims, 12 Drawing Sheets

(56) References Cited

U.S. PATENT DOCUMENTS

| | | | |
|---|---|---|---|
| 8,261,068 B1* | 9/2012 | Raizen et al. | 713/165 |
| 2002/0002661 A1 | 1/2002 | Blumenau et al. | |
| 2004/0186881 A1 | 9/2004 | Porter et al. | |
| 2004/0230787 A1 | 11/2004 | Blumenau et al. | |
| 2006/0212671 A1 | 9/2006 | Todd | |
| 2010/0228915 A1* | 9/2010 | Ogihara et al. | 711/114 |
| 2010/0281239 A1 | 11/2010 | Sudhakar et al. | |
| 2011/0258402 A1* | 10/2011 | Nakajima et al. | 711/154 |
| 2012/0254405 A1 | 10/2012 | Ganesh et al. | |
| 2012/0254406 A1* | 10/2012 | Nagai et al. | 709/224 |

OTHER PUBLICATIONS

Vahalia, Uresh, et al., Metadata Logging in an NFS Server, USENIX 1995, Jan. 16-20, 1995, New Orleans, Louisiana, 12 pages, The USENIX Association, Berkeley, CA.

Burkes, D.L., and Treiber, R.K., "Design Approaches for Real-Time Transactions Processing Remote Site Recovery," Computer Society International Conference (COMPCON), Spring Meeting, Los Alamitos, Feb. 26-Mar. 2, 1990, No., Conf. 35, Feb. 23, 1990, Institute of Electrical and Electronics Engineers, New York, N.Y., pp. 568-572.

Batsakis, Alexandros, and Burns, Randal, "NFSv4 as the Building Block for Fault Tolerant Applications," Johns Hopkins University, NEPS Workshop at the University of Michigan, Ann Arbor, MI, Dec. 4, 2003, position paper (4 pages) and presentation (16 pages).

Shastry, Mallikarjuna, et. al. , Selection of a Checkpoint Interval in Coordinated Checkpointing Protocol for Fault Tolerant Open MPI, (IJCSE) International Journal on Computer Science and Engineering, vol. 02, No. 06, 2010, pp. 2064-2070, Keja Publications, Vandalur, Chennai, India.

Lissot, Anthony, Linux Partition HOWTO, Apr. 13, 2009, 30 pages, linux.com, Linux Foundation, San Francisco, CA.

Self, Karsten M., Linux Partitioning mini-FAQ, Dec. 28, 2010, 11 pages, linuxmafia.com, Menlo Park, CA.

Red Hat Deployment Guide Sec. 10.4 to 10.5.3, Jun. 11, 2011, 15 pages, Red Hat Inc., Raleigh, NC.

EMC Plug-Ins for VMware vCENTER, Aug. 10, 2010, 5 pages, EMC Corporation, Hopkinton, MA.

Bibliographic Data and Document Listing for PCT/JP2011/057592, 3 pages, Oct. 31, 2013, World Intellectual Property Organization (WIPO), Geneva, Switzerland.

Patent Assignment Abstract of Title for U.S. Appl. No. 8,261,068, 2 pages, Oct. 31, 2013, U.S. Patent and Trademark Office, Alexandria, VA.

* cited by examiner

| ELEMENTS OF METADATA WHICH REPRESENT THE LVM STATE | DATA CAPTURE TOOL FOR THE METADATA |
|---|---|
| PHYSICAL AND LOGICAL DISK PARTITION LAYOUT | fdisk |
| LVM PHYSICAL VOLUME (PV) LAYOUT | pvscan, pvdisplay |
| LVM VOLUME GROUPS (VG) | vgscan, vgdisplay |
| LVM LOGICAL VOLUMES (LV) | lvscan, lvdisplay |
| FILE SYSTEM MOUNTS | mount |

ERROR DETECTION AND RECOVERY TOOL FOR LOGICAL VOLUME MANAGEMENT IN A DATA STORAGE SYSTEM

LIMITED COPYWRITE WAIVER

A portion of the disclosure of this patent document contains computer code listings and command formats to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

FIELD OF THE INVENTION

The present invention relates generally to logical volume management for a data storage system. More particularly, the invention relates to detection and correction of errors in the configuration of the logical volumes and underlying storage objects in the data storage system.

BACKGROUND OF THE INVENTION

An increasing amount of processing power, memory capacity, storage capacity, and network data transmission bandwidth is available at decreasing cost. Consequently, the cost of managing stored data is becoming more expensive than the cost of the storage capacity. One way of dealing with this problem is to service multiple users with storage from a network storage system so that the management of the stored data can be consolidated and shared among the multiple users. The network storage system may also provide more efficient capabilities for sharing of the stored data among the multiple users, for moving less frequently accessed data to less expensive mass storage devices, and for providing backup and recovery for disaster protection.

Logical volume management relates to storage management by partitioning of storage of a storage system into logical volumes. A logical volume can then be assigned to a particular client or a group of clients, or a file system shared among a group of clients can be built on a logical volume. The partitioning of storage of a storage system into logical volumes typically involves arranging the storage into physical volumes, configuring volume groups of the physical volumes, and then configuring logical volumes within the volume groups. In general, a physical volume (PV) consists of one or many partitions (or physical extent groups) on a physical drive. A volume group (VG) is composed of one or more physical volumes, and contains one or more logical volumes. A logical volume is a unit of logical storage contained within a volume group.

A specific example of a known method of logical volume management is a Linux Logical Volume Management (LVM) utility. LVM keeps a metadata header at the start of every physical volume, each of which is uniquely identified by a universally unique identifier (UUID). Each physical volume's header is a complete copy of the entire volume group's layout, including the UUIDs of all other physical volumes, the UUIDs of all logical volumes, and an allocation map of physical extents to logical extents. This simplifies data recovery in the event of physical volume loss. The logical volumes are defined as virtual block devices having contents mapped to certain physical volumes. For example, to bring a volume group online, a "vgchange" tool searches for physical volumes in all available block devices, parses the metadata header in each PV found, computes the layouts of all visible volume groups, and loops over each logical volume in the volume group to be brought online. Each logical volume is brought online by checking if the logical volume has all its physical volumes visible, and then creating a new, empty device mapping, and mapping the logical volume onto the data areas of the physical volumes that the logical volume belongs to.

SUMMARY OF THE INVENTION

As logical volumes have grown in number, size, and complexity, it has been found that errors may arise in the logical volume partitions well before the errors are detected by a failure to access data in the logical volumes. The logical volume partitions may become corrupted due to bad disks, other system hardware failures, software bugs, and administrator errors during the logical volume configuration process. Therefore it is desired to discover and correct these errors before they cause a failure to access data in the logical volumes.

In accordance with one aspect, the invention provides a method of configuring logical volumes in a data storage system. The logical volumes are contained in volume groups of physical volumes of storage in the data storage system. The logical volumes and volume groups are defined in headers of the physical volumes. The method includes a data processor of the data storage system executing computer instructions stored on a non-transitory computer readable storage medium to perform the steps of: (a) creating a configuration database of configuration information about the physical volumes, volume groups, and logical volumes defined in the headers of the physical volumes, and storing the configuration database in storage separate from the physical headers of the physical volumes; and thereafter (b) checking the configuration of the physical volumes, volume groups, and logical volumes in the volume headers by capturing configuration information about the physical volumes, volume groups, and logical volumes from the headers of the physical volumes, and comparing the captured configuration information to the configuration information about the physical volumes, volume groups, and logical volumes in the configuration database to detect a configuration error in at least one of the headers of the physical volumes; and (c) upon detecting the configuration error in at least one of the headers of the physical volumes, automatically correcting the configuration error in at least one of the headers of the physical volumes.

In accordance with another aspect, the invention provides a computer program product including non-transitory computer readable storage medium storing computer instructions. The computer instructions, when executed by a data processor of a data storage system, perform the steps of: (a) creating a configuration database of configuration information about the physical volumes, volume groups, and logical volumes defined in the headers of the physical volumes, and storing the configuration database in storage separate from the physical headers of the physical volumes; and thereafter (b) checking the configuration of the physical volumes, volume groups, and logical volumes in the volume headers by capturing configuration information about the physical volumes, volume groups, and logical volumes from the headers of the physical volumes, and comparing the captured configuration information to the configuration information about the physical volumes, volume groups, and logical volumes in the configuration database to detect a configuration error in at least one of the headers of the physical volumes; and (c) upon detecting the configuration error in at least one of the headers of the physical volumes, automatically correcting the configuration error in at least one of the headers of the physical volumes.

In accordance with a final aspect, the invention provides a data storage system. The data storage system includes back-end data storage devices, data mover computers coupled to the back-end data storage devices for moving data between the back-end data storage devices and network clients, and a control station computer coupled to the data mover computers for configuring and controlling the data storage system. The control station computer includes a data processor and non-transitory computer readable storage medium storing program instructions. The program instructions, when executed by the data processor, perform the steps of: (a) creating a configuration database of configuration information about physical volumes, volume groups, and logical volumes defined in headers of physical volumes in the back-end data storage devices, and storing the configuration database in storage separate from the headers of the physical volumes; and thereafter (b) checking the configuration of the physical volumes, volume groups, and logical volumes in the volume headers by capturing configuration information about the physical volumes, volume groups, and logical volumes from the headers of the physical volumes, and comparing the captured configuration information to the configuration information about the physical volumes, volume groups, and logical volumes in the configuration database to detect a configuration error in at least one of the headers of the physical volumes; and (c) upon detecting the configuration error in at least one of the headers of the physical volumes, automatically correcting the configuration error in at least one of the headers of the physical volumes.

BRIEF DESCRIPTION OF THE DRAWINGS

Additional features and advantages of the invention will be described below with reference to the drawings, in which.

Figure 1:
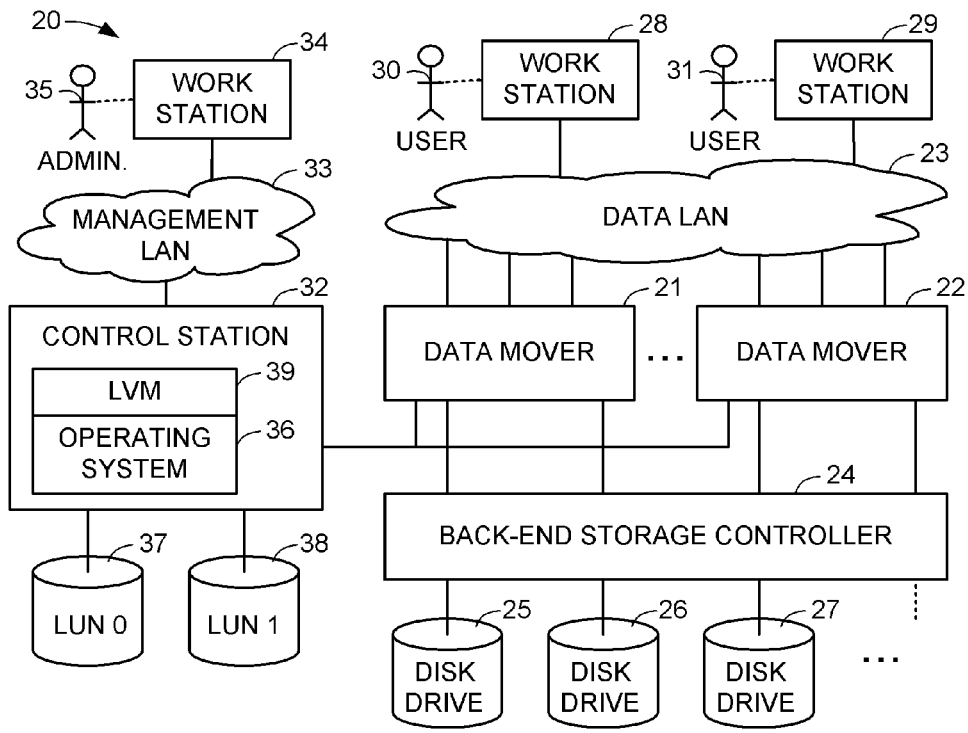
FIG. 1 is a block diagram of a data storage system including a control station computer and data mover computers.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data storage system 20 using logical volume management (LVM). The storage system 20 includes data movers (or file servers) 21, 22 that move data back and forth between a data LAN 23 and a back-end storage controller 24 of an array of disk drives 25, 26, 27. The data LAN 23, for example, links client work stations 28, 29 of human users 30, 31 to the data movers 21, 22 for shared access to storage of the disk drives 25, 26, 27.

A control station 32 provides a management station for the data storage system 20. The storage system 20 is configured and controlled via the control station 32. The control station 32 is coupled to a management LAN 33, from which the control station software may be downloaded, for example from a work station 34 of an administrator 35. The management LAN 33 may be connected to the data LAN 23 and/or the Internet. Alternatively, the management entity may be a user terminal attached directly to the control station 32, or may be a terminal 34 attached via the management LAN 33, or may be an application operating via remote download, or via other known ways.

The control station 32 is a general purpose digital computer that runs an operating system 36 and relies on Logical Units (LUNs), referred to as control LUNs 37 and 38, for storage of runtime database and configuration information. The control LUNs 37, 38 are shown in FIG. 1 as connected directly to the control station 32, but they could reside in the back-end disk drives 25, 26, 27 or anywhere else in the storage system 20. A Linux Logical Volume Manager (LVM) 39 is used to manage logical volume partitions on logical units of the back-end storage 25, 26, 27.

In an alternative arrangement, the LVM 39 is replicated and included in each of the data movers 21, 22 for managing a respective group of the back-end disk drives 25, 26, 27 assigned to each of the data movers. In either case, logical volume partitions are created on LUNs of the back-end storage. The back-end storage controller 24 may employ RAID or other techniques for striping data of each of the back-end LUNs across a group of the back-end disk drives 25, 26, 27 to provide enhanced error protection or to increase the maximum rate of data streaming from a LUN.

Figure 2:
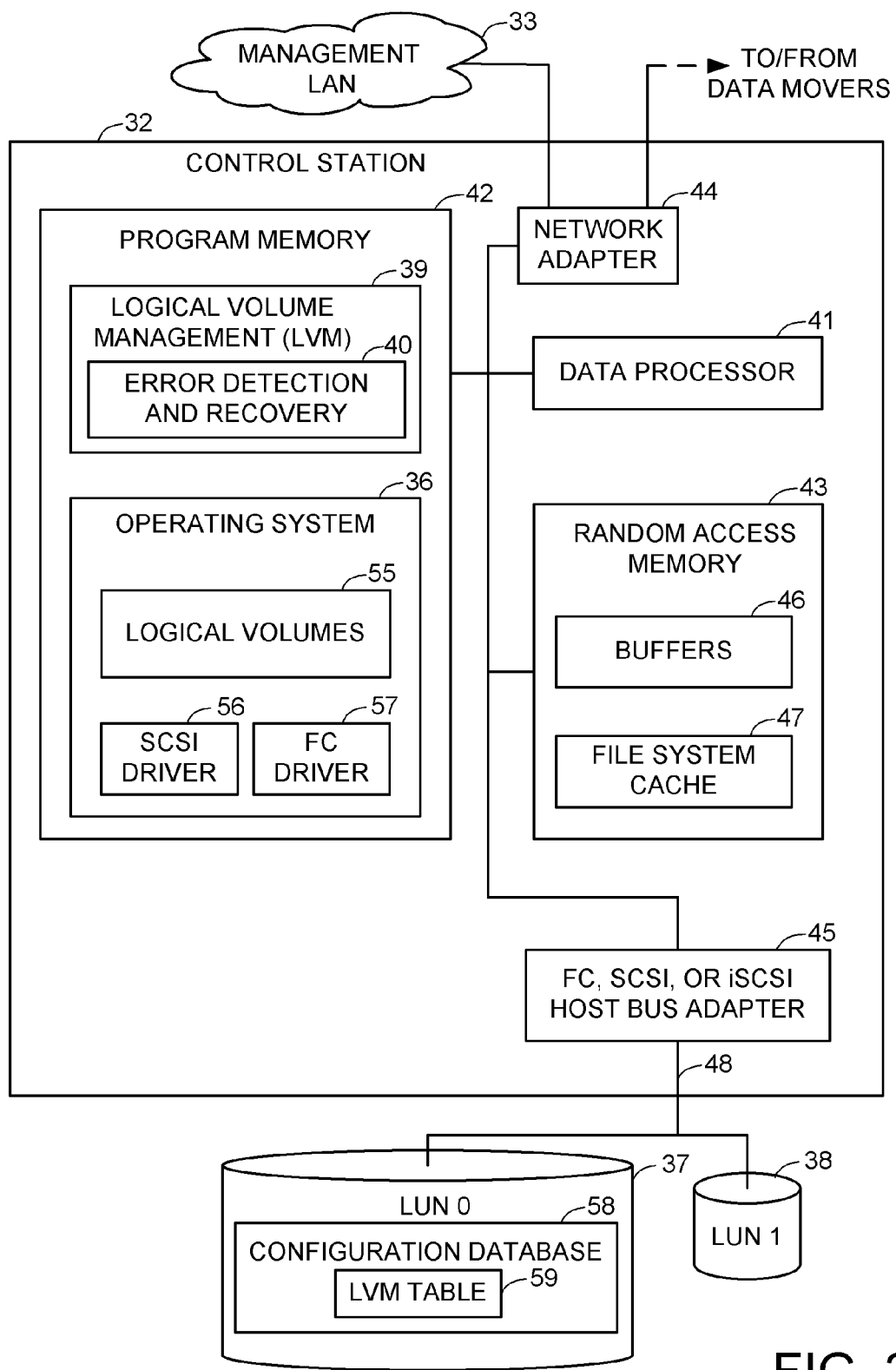
FIG. 2 is a block diagram of the control station computer introduced in FIG. 1.

FIG. 2 shows details of the control station 32. The control station 32 is built on a single motherboard or server blade. The control station 32 includes a data processor 41, program memory 42, random access memory 43, a network adapter 44, and a host bus adapter 45. The data processor 41 includes one or more core central processing units (CPUs) for executing computer program instructions stored in the program memory 42.

The program memory 42 is a non-transitory computer readable storage medium, such as dynamic random access memory (DRAM). In general, non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks.

The program memory 42 stores the operating system 36 and the logical volume management (LVM) program 39. The operating system 36 includes a logical volumes layer 55 providing access to logical volumes upon which file systems are built. Each logical volume is configured from data storage. The logical volumes layer 55 is layered over a SCSI driver 56 and a Fibre-Channel protocol (FC) driver 57 in order to access the logical unit numbers (LUNs) in the disk drives 37, 38. The data processor 41 sends storage access requests through the host bus adapter 45 using the SCSI protocol, the iSCSI protocol, or the Fibre-Channel protocol, depending on the particular protocol used by the host bus 48.

The present invention concerns a new LVM error detection and recovery tool 40 in the logical volume management program 39. The LVM error detection and recovery tool 40 is invoked periodically as a background task to check the logical volumes for potential LVM related problems and to solve these problems automatically before these problems would cause inappropriate processing of data access requests from the clients of the storage system. For example, it is desired that when an error occurs in the configuration of a logical volume due to a hardware or software failure, this error is detected and corrected before the error would cause a denial of client access to the logical volume, or cause client data to be misplaced so that the client data would become inaccessible to the client.

The LVM error detection and recovery tool 40 can also be invoked after there has been an intended change in the logical volume configuration in order to check for issues in the new configuration. For example, the administrator can invoke the LVM error detection and recovery tool 40 after the administrator has added new disk drives and has used the logical volume management program 39 to configure logical volumes from the storage of the new disk drives. The administrator or a crash recovery program can also invoke the LVM error detection and recovery tool 40 during a re-boot in response to a system crash, or upon re-boot if a system log indicates that a logical volume configuration change was interrupted by the re-boot, or after restoration of the LVM configuration to an LVM configuration in a configuration database 58. For example, as shown in FIG. 2, a configuration database 58 is stored in LUN 0 of the disk drive 37, and the current LVM configuration is recorded in an LVM table 59 in the configuration database 58.

Figure 3:
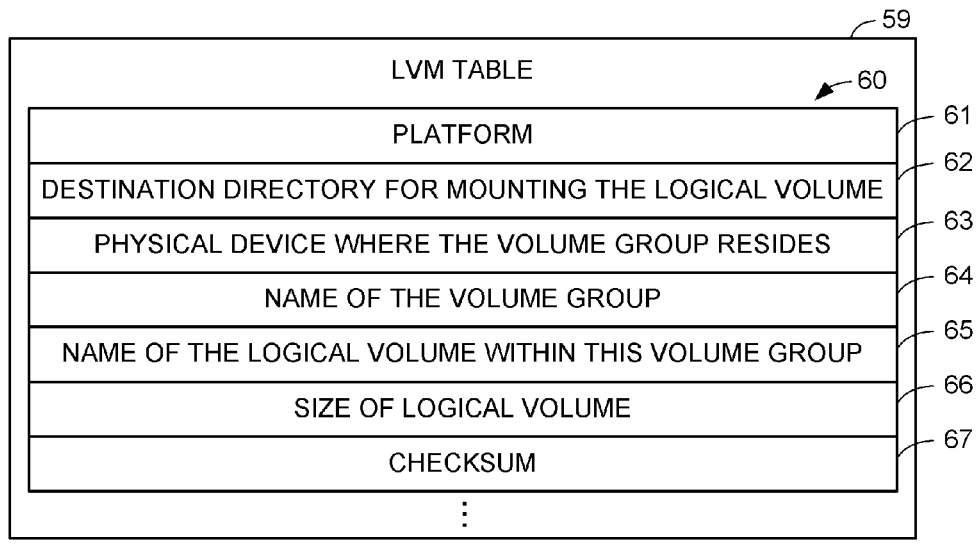
FIG. 3 is a table of logical volume properties in a configuration database in the storage system of FIG. 1.

FIG. 3 shows an example of the LVM table 59. The LVM table includes an entry 60 for each logical volume that has been configured by the logical volume management program (39 in FIG. 1). The entry 60 includes values for attributes of the logical volume, such as the platform 61, the destination directory 62 for mounting the logical volume, the physical device 63 where the volume group resides, the name 64 of the volume group, the name 65 of the logical volume within this volume group, and the size 66 of the logical volume. Also included is a checksum 67 that can be used to verify the integrity of the entry 60.

Following is an example of the information found in the LVM table 59:

. . . NS|0|/home|$LVM_PRI_IDE|emc_vg_pri_ide|emc_lv_home|600M|SYS
NS|0|/celerra/backup|$LVM_PRI_IDE|emc_vg_pri_ide|emc_lv_celerra_backup|840M_SYS
NS|0|/nbsnas/jserver|$LVM_LUN_0|emc_vg_lun_0|emc_lv_nbsnas_jserver|1416M|NAS
NS|0|nas/jserver|$LVM_PRI_IDE|emc_vg_pri_ide|emc_lv_nas jserver|1416M|NAS
NS|0|/nas/var|$LVM_LUN_5|emc_vg_lun_5|emc_lv_nas_var|100M|NAS
NS|0|nas/var/dump|$LVM_LUN_0|emc_vg_lun_0|emc_lv_nas_var dump|1692M|NAS
NS|0|nas/var/auditing|$LVM_LUN_0|emc_vg_lun_0|emc_lv_nas_var_auditing|120M|NAS
NS|0|/nas/var/backup|$LVM_LUN_5|emc_vg_lun_5|emc_lv_nas_var backup|840M|NAS
NS|0|/nas/var/emcsupport|$LVM_LUN_5|emc_vg_lun_5|emc_lv_nas_var_emcsupport|560M|NAS
NS|0|/nas/var/log|$LVM_LUN_5|emc_vg_lun_5|emc_lv_nas_var_log|212M|NAS
NS|0|/celerra/backendmonitor|$LVM_PRI_IDE|emc_vg_pri_ide|emc_lv_celerra_backendmonitor|8M|SYS
NS|0|/celerra/audit|$LVM_PRI_IDE|emc_vg_pri_ide|emc_lv_celerra_audit|120M|SYS
NS|0|/celerra/commoncache|$LVM_PRI_IDE|emc_vg_pri_ide|emc_lv_celerra_commoncache|512M|NAS
NS|0|/celerra/ccc|$LVM_PRI_IDE|emc_vg_pri_ide|emc_lv_celerra_ccc|560M|NAS
 . . .

Figure 4:
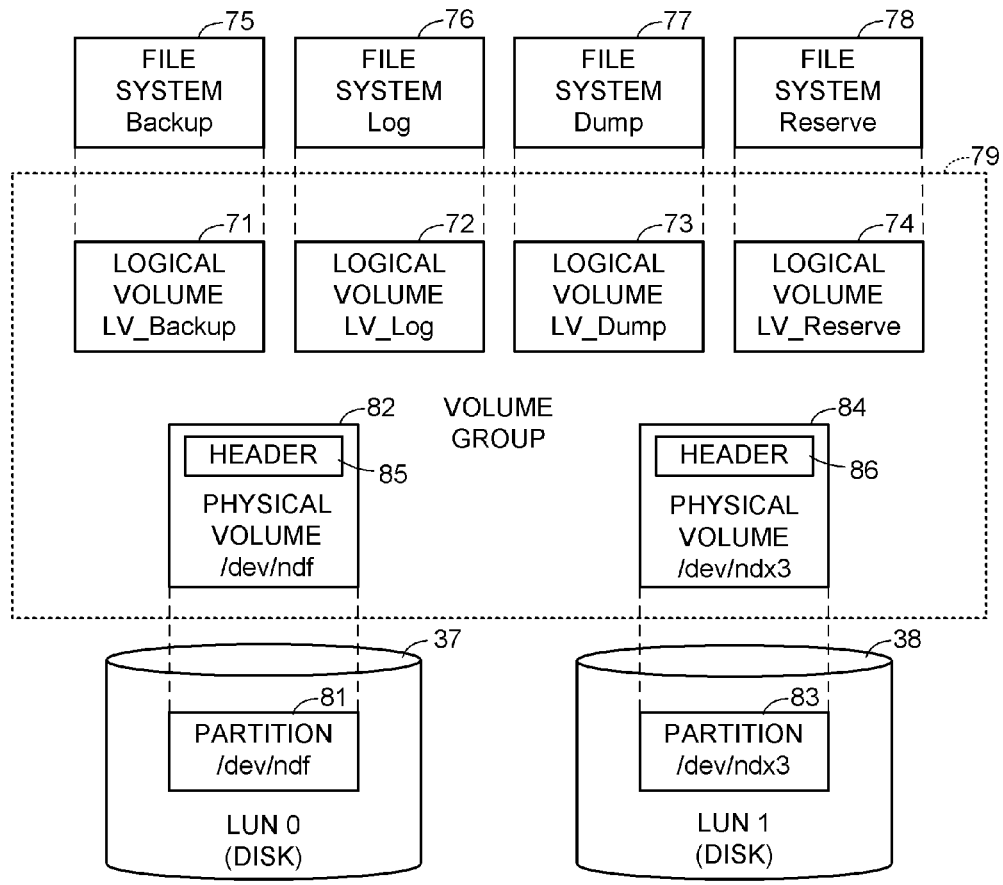
FIG. 4 is a block diagram of partitioning of the storage in the storage system of FIG. 1 into logical volumes and volume groups.

FIG. 4 shows an example of partitioning of storage of LUN 0 in the disk drive 37 and storage of LUN 1 in the disk drive 38. The storage of the disk drive 37 has a partition 81 named "/dev/ndf", and this partition is the container for a physical volume 82 identified by the same name. In a similar fashion, the storage of the disk drive 38 has a partition 83 named "dev/ndx3", and this partition is the container for a physical volume 84 having the same name. The physical volumes 82 and 84 are combined into a volume group 79, and the storage of the volume group is subdivided among logical volumes 71, 72, 73, and 74.

A physical volume is included in no more than one volume group. A volume group may include more than one physical volume, and a volume group may include physical volumes included in different disk drives. Each physical volume 82, 84 has a respective header 85, 86. Each header 85, 86 contains the layout of the volume group 79, including the UUIDs of all other physical volumes in the volume group 79, the UUIDs of all of the logical volumes 71, 72, 73, 74 in the volume group, and an allocation map of physical extents to logical extents.

The logical volumes 71, 72, 73, 74 serve as containers for respective file systems 75, 76, 77, and 78. For example, the file system 75 is named "Backup" and is used to store a backup copy of the configuration of the data storage system. The file system 76 is named "Log" and is used to store a log of configuration changes and other events during operation of the storage system. The file system 77 is named "Dump" and is used to store dumps of program instructions or data resulting from exceptions or during diagnostic probes of the system. The file system 78 is named "Reserve" and is reserved for future expansion and can be used presently for storage of temporary data.

Figure 5:
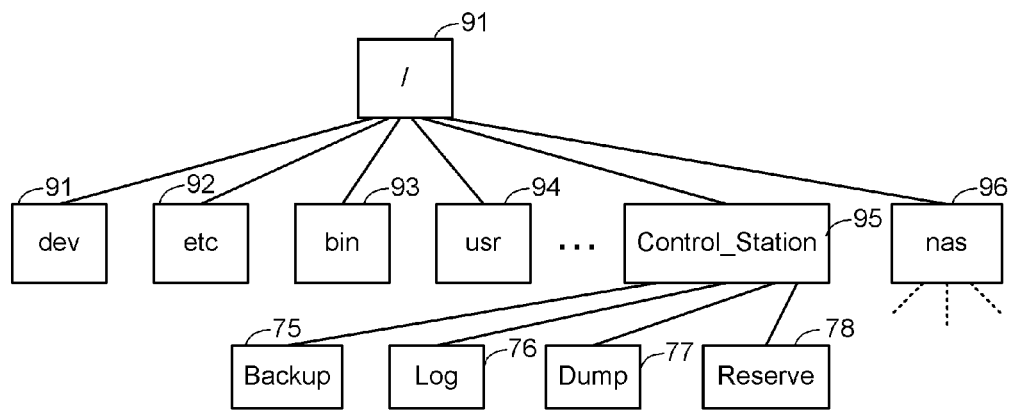
FIG. 5 is a bock diagram of a file system directory structure in the control station of FIG. 1.

FIG. 5 shows a way of mounting the file systems 75, 76, 77, and 78 in the directory structure of a LINUX operating system. The kernel of the LINUX operating system is contained in files of a root directory 91 having a pathname of "/". Physical devices accessible to the kernel are defined by device files located in a subdirectory 91 named "dev". Static configuration files for LINUX programs are located in a subdirectory 92 named "etc". User command binary files for LINUX programs are located in a subdirectory 93 named "bin". User sharable read-only data is located in a subdirectory 94 named "usr".

A subdirectory 95 named "Control_Station" contains mount points for the control station file systems stored in the external disk drives (37, 38 in FIG. 4). Therefore, the "Backup" file system 75, the "Log" file system 76, the "Dump" file system 77, and the "Reserve" file system 78 are mounted in the "Control_Station" subdirectory 95. In a similar fashion, a subdirectory 96 named "nas" contains mount points for file systems stored in the back-end disk storage (25, 26, 27 in FIG. 1) and accessible to the network clients (28, 29 in FIG. 1).

Figures 6, 7:
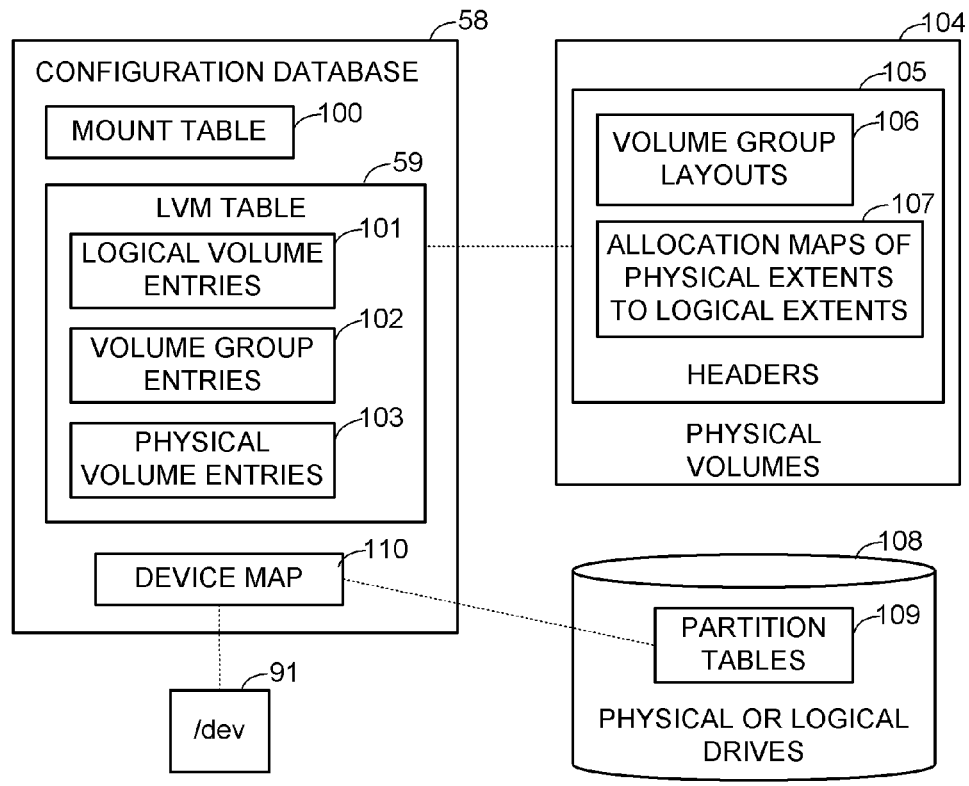
FIG. 6 is a block diagram of data storage locations of configuration information in the storage system of FIG. 1.
FIG. 7 is a table of data capture tools for metadata of the LVM state in the storage system of FIG. 1.

FIG. 6 shows further details of the configuration database 58 and sources of LVM configuration information for this configuration database 58. In addition to the LVM table 59, the configuration database 58 includes a mount table 100 and a device map 110. The mount table 100 indicates file systems that are mounted. The LVM table 59 includes logical volume entries 101, volume group entries 102, and physical volume entries 103.

The device map 110 identifies logical and physical storage devices in the data storage system and LUNs associated with the logical and physical storage devices. For the storage system 20 in FIG. 1, the device map 110 may include storage devices directly attached to the control station (such as the disk drives 37 and 38), storage devices directly attached to each of the data movers 21 and 22, and storage devices directly attached to the back-end storage controller (such as the disk drives 25, 26, and 27). The device map 110, for example, identifies each partition on each logical or physical disk drive. The partitions on each logical or physical disk drive are identified by a partition table on the disk drive. Thus, the device map 110 can be reconstructed by scanning the logical or physical drives 108 and collecting information about the partitions from the partition tables 109. The partition information about the storage devices directly attached to the control station is also stored in the "/dev" subdirectory 91.

The physical volumes, volume groups, and logical volumes are created during a process of configuring LVM for the LINUX operating system. This configuration process typically involves creating a "boot" partition for the LINUX operating system, and then creating the LVM physical volumes. An LVM physical volume is contained on only one drive. When an LVM physical volume is created, an entry is created in the set of physical volume entries 103. The entry specifies the name of the partition for the physical volume and the size of the physical volume.

A volume group can be created once all of the physical volumes have been created for the volume group. When a volume group has been created, an entry is created in the set of volume group entries 102. The entry specifies a name for the volume group, the physical volumes in the group, and the volume group size. Once a volume group has been created, logical volumes can be created in the volume group. A mount point in the directory structure can be specified when the logical volume is created.

For creating or modifying the LVM configuration, the logical volume management program (39 in FIG. 1) recognizes basic LVM creation commands, destruction or removal commands, attribute change commands, and manipulation commands. Additional commands are provided for invoking LVM data capture tools and LVM display tools as further described below with reference to FIG. 7. These LVM data capture and display tools can be invoked at particular steps in the installation process to verify and display configuration changes made and identify requested changes that were not made. Additional LVM pseudo-commands are provided for checking an LVM configuration and correcting errors in the LVM configuration.

Following are examples of the basic LINUX LVM creation commands:

pvcreate—Used to create physical volumes.
vgcreate—Used to create volume groups.
lvcreate—Used to create logical volumes.

Following are examples of the basic LINUX LVM destruction or removal commands:

pvremove—Used to wipe the disk label of a physical drive so that LVM does not recognize it as a physical volume.
vgremove—Used to remove a volume group.
lvremove—Used to remove a logical volume.

Following are examples of the basic LINUX LVM attribute change commands:

pvchange—Used to change the attribute of a physical volume.
vgchange—Used to change the attribute of a volume group.
lvchange—Used to change the attribute of a logical volume.

Following are examples of the basic LINUX LVM manipulation commands:

vgextend—Used to add new physical volume(or partition(s) of same) to a volume group.
vgreduce—Used to remove physical volume(or partition(s) of same) from a volume group.
lvextend—Used to increase the size of a logical volume.
lvreduce—Used to decrease the size of a logical volume.

FIG. 7 shows a table describing elements of metadata and data capture tools for the LVM software in the data storage system (20 in FIG. 1). A complication in this data storage system is that the system configuration information is distributed over the control station (32 in FIG. 1), the data mover computers (21, 22 in FIG. 1), and the back-end storage controller (24 in FIG. 1). Consequently, different data capture tools are used for different elements of metadata representing the LVM state in order to check the configuration information for errors and for creating and storing a backup copy of the configuration information. Metadata is captured by performing a live scan of the system to obtain the elements associated or needed for restoring or comparing the LVM state of the data storage system. The metadata, which represents the LVM state on the data storage system, includes the physical and logical disk partition layout 111, the LVM physical volume (PV) layout 112, the LVM volume groups (VG) 113, LVM logical volumes (LV) 114, and file system mounts 115. The metadata has associated data, representing values of attributes of these elements of metadata.

As shown in FIG. 7, a LINUX "fdisk" tool is used for capturing data about the physical and logical disk partition layout 111. LINUX "pvscan" tool scans the storage system for physical volumes and discovers the LVM physical volume (PV) layout 112. LINUX "pvdisplay" display tool displays information about this physical volume layout. LINUX "vgscan" tool scans the storage system for LVM logical volume groups (VG) 113. LINUX "vgdisplay" tool displays information about these logical volume groups. LINUX "lvscan" tool scans the storage system for LVM logical volumes (LV) 114. LINUX "lvdisplay" tool displays information about these logical volumes. Finally, LINUX "mount" tool is used for capturing data about file system mounts 115.

Following are specific examples of these elements of metadata and their associated data:

[root ~]#fdisk-1/dev/hda/dev/nda/dev/ndf
Disk/dev/hda: 250.0 GB, 250059350016 bytes
255 heads, 63 sectors/track, 30401 cylinders
Units=cylinders of 16065*512=8225280 bytes

| Device Boot | Start | End | Blocks | Id | System |
|---|---|---|---|---|---|
| /dev/hda1* | 1 | 16 | 128488+ | 83 | Linux |
| /dev/hda2 | 17 | 69 | 425722+ | 83 | Linux |
| /dev/hda3 | 70 | 330 | 2096482+ | 83 | Linux |
| /dev/hda4 | 331 | 30401 | 241545307+ | 5 | Extended |
| /dev/hda5 | 331 | 591 | 2096451 | 83 | Linux |
| /dev/hda6 | 592 | 852 | 2096451 | 82 | Linux swap |
| /dev/hda7 | 853 | 30401 | 237352311 | 8e | Linux LVM |

Disk/dev/nda: 11.8 GB, 11811094528 bytes
255 heads, 63 sectors/track, 1435 cylinders
Units=cylinders of 16065*512=8225280 bytes

| Device Boot | Start | End | Blocks | Id | System |
|---|---|---|---|---|---|
| /dev/nda1* | 1 | 17 | 136521 | 6 | FAT16 |
| /dev/nda3 | 654 | 1435 | 6281415 | 8e | Linux LVM |

Disk/dev/ndf: 68.7 GB, 68719411200 bytes
255 heads, 63 sectors/track, 8354 cylinders
Units=cylinders of 16065*512=8225280 bytes
Disk/dev/ndf doesn't contain a valid partition table
[root ~]#pvdisplay-c
/dev/ndf:emc_vg_lun__5:134209536:-1:8:8:-1:4096:
16383:15955:428:WVvn4P-UqFq-Oztt-3RCh-QYfG-3V3i-QbBnc8
/dev/hda7:emc_vg_pri_ide:474701824:-1:8:8:-1:4096:
57947:57091:856:ayU6Rj-3GYa-HLfG-12Xw-Hnzv-LhhQ-zE4Qhz
/dev/nda3:emc_vg_lun__0:12558336:-1:8:8:-1:4096:
1533:726:807:A9M87C-UTyG-2146-b3CM-KgTN-Dfia-q9nTIu
[root ~]#vgdisplay-c
emc_vg_lun__5:r/w:772:-1:0:4:4:-1:0:1:1:67104768:
4096:16383:428:15955:xHuA3V-juRF-CgkI-p1K6-LTW1-57CY-SUH4nv
emc_vg_pri_ide:r/w:772:-1:0:5:5:-1:0:1:1:237350912:
4096:57947:856:57091:5dgLmx-4OvA-VvRy-LFAd-ySsS-L1Jn-FzaCg1
emc_vg_lun__0:r/w:772:-1:0:3:3:-1:0:1:1:6279168:4096:
1533:807:726:6xJ15o-ERNc-t8    m3-owyd-ica5-vwK1-85V2F6
[root ~]#1vdisplay-c
/dev/emc_vg_lun__5/emc_lv_nas_var:emc_vg_lun__5:3:
1:-1:1:204800:25:-1:0:0:253:6
/dev/emc_vg_lun__5/emc_lv_nas_var_backup:emc_vg_lun__5:3:1:-1:1:1720320:210:-1:0:0:253:9
/dev/emc_vg_lun__5/emc_lv_nas_var_log:emc_vg_lun__5:3:1:-1:1:434176:53:-1:0:0:253:11
/dev/emc_vg_lun__5/emc_lv_nas_var_emcsupport:emc_vg_lun__5:3:1:-1:1:1146880:140:-1:0:0:253:10
/dev/emc_vg_pri_ide/emc_lv_home:emc_vg_pri_ide:3:1:-1:1:1228800:150:-1:0:0:253:0
/dev/emc_vg_pri_ide/emc_lv_nas_jserver:emc_vg_pri_ide:3:1:-1:1:2899968:354:-1:0:0:253:1
/dev/emc_vg_pri_ide/emc_lv_celerra_backup:emc_vg_pri_ide:3:1:-1:1:1720320:210:-1:0:0:253:2
/dev/emc_vg_pri_ide/emc_lv_celerra_backendmonitor:emc_vg_pri_ide:3:1:-1:1:16384:2:-1:0:0:253:3
/dev/emc_vg_pri_ide/emc_lv_celerra_ccc:emc_vg_pri_ide:3:1:-1:1:1146880:140:-1:0:0:253:4
/dev/emc_vg_lun__0/emc_lv_nas_var_dump:emc_vg_lun__0:3:1:-1:1:3465216:423:-1:0:0:253:7
/dev/emc_vg_lun__0/emc_lv_nbsnas_jserver:emc_vg_lun__0:3:1:-1:1:2899968:354:-1:0:0:253:5
/dev/emc_vg_lun__0/emc_lv_nas_var_auditing:emc_vg_lun__0:3:1:-1:1:245760:30:-1:0:0:253:8

Figure 8:
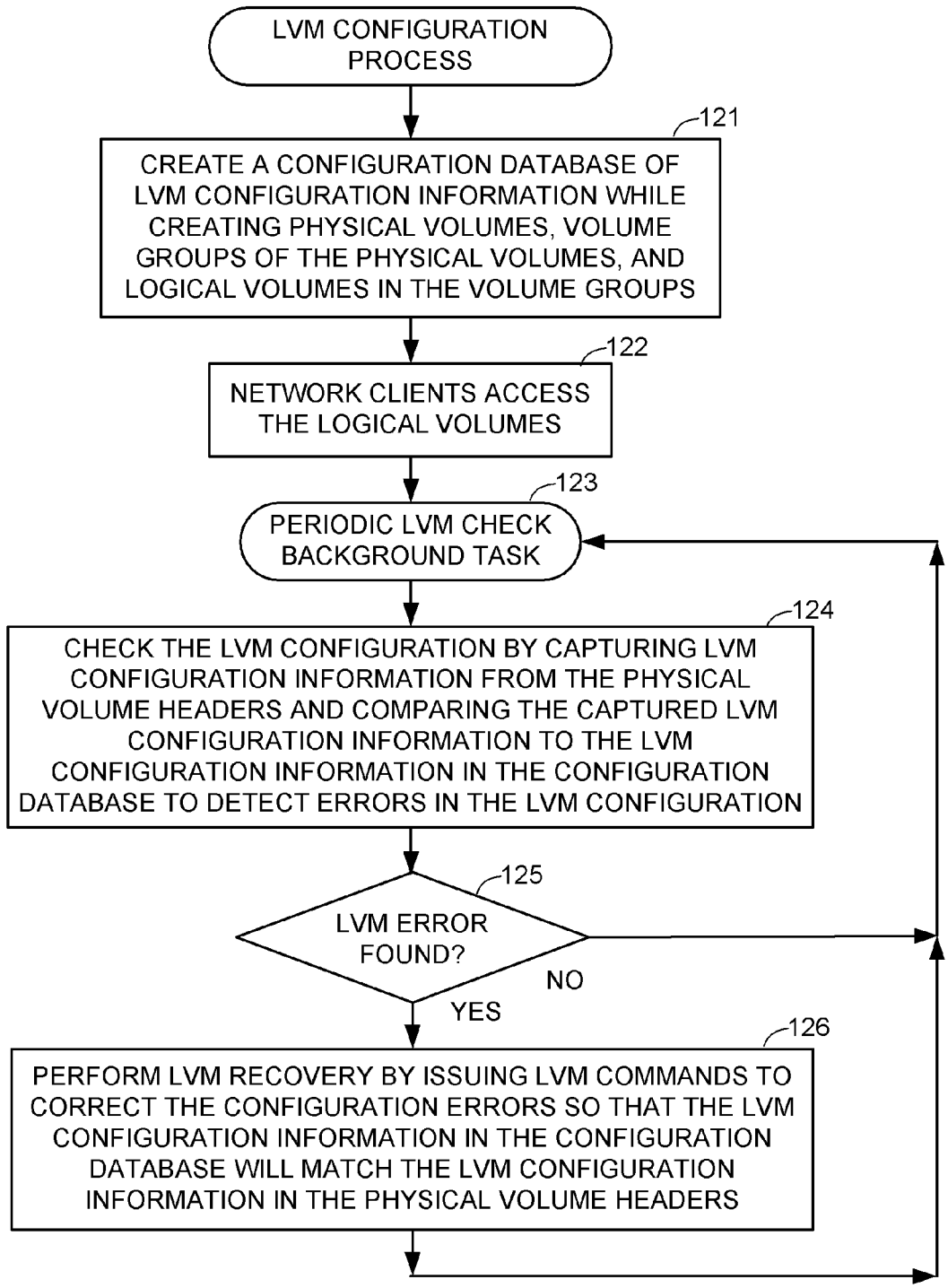
FIG. 8 is a flowchart of an LVM configuration process and a periodic background task of checking the LVM configuration for errors and correcting configuration errors in the data storage system of FIG. 1.

FIG. 8 shows use of the LVM error detection and recovery tool (40 in FIG. 2) in a periodic background task during normal operation of the storage system (20 in FIG. 1). In a first step 121, during an LVM configuration process, the configuration database (58 in FIG. 2) of LVM configuration information (in the LVM table 40 in FIG. 2) is created while creating physical volumes, groups of the physical volumes, and logical volumes in the volume groups. In step 122, after the logical volumes have been created and activated, network clients access the logical volumes.

In step 123, the LVM error detection and recovery tool is invoked as a periodic background task by a real-time scheduler of the control station, for example, every day during a time of low client demand, such as 4:00 a.m.

In step 124, an LVM configuration check routine, as further described below with reference to FIGS. 10-12, checks the LVM configuration of the storage system by capturing the LVM configuration information from the physical volume headers and comparing the captured LVM configuration information to the LVM configuration information in the configuration database to detect errors in the LVM configuration. The scan of the physical volumes to capture the LVM configuration information and the comparison with the LVM configuration information in the configuration database ensure that the logical volumes have the correct size and are mounted, activated, and operating correctly.

In step 125, if an LVM error is found, then execution continues to step 126 to perform LVM recovery, as further described below with reference to FIGS. 13-15. LVM recovery is performed by issuing LVM commands to correct the configuration errors so that the LVM configuration information in the configuration database will match the LVM configuration information in the physical volume headers. If the correct physical volumes, volume groups, and logical volumes do not exist (as described in the LVM table), then they will be recreated or increased or decreased to the correct size. After the recovery in step 126, execution loops back to step 123 to continue checking the LVM configuration periodically in background. Also, if an LVM error is not found in step 125, execution also loops back to step 123 to continue checking the LVM configuration periodically in background.

The administrator (35 in FIG. 1) may review a summary report of the configuration check performed in step 124 and may review a log of the error corrections performed in step 126. The administrator may also invoke the LVM error detection and recovery tool at any time using a command line interface to the control station (32 in FIG. 1).

Figure 9:
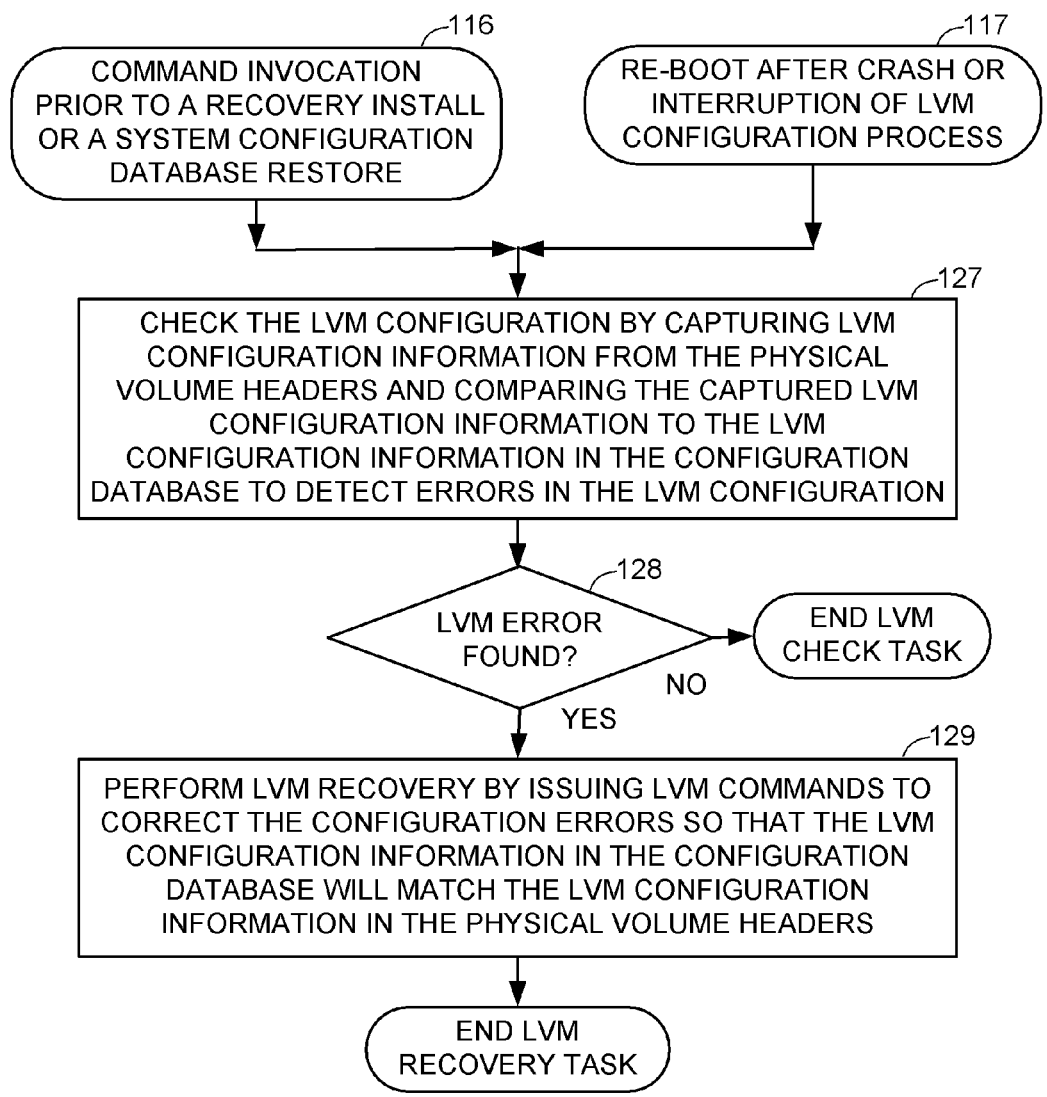
FIG. 9 is a flowchart of an LVM configuration checking and error recovery task performed prior to a recovery install or a system configuration database restore or upon reboot after a crash or interruption of the LVM configuration process.

FIG. 9 shows the command invocation of the LVM error detection and recovery tool in step 116. For example, the administrator invokes the LVM error detection and recovery tool in step 116 prior to a recovery install or a system configuration database restore so that backup copies of files systems and databases are loaded into the correct logical volumes. In general, the recovery install or database restore will restore at least one of the logical volumes with a backup copy of data having been stored in one or more of the logical volumes. The LVM error detection and recovery tool also is invoked automatically in step 117 during a re-boot process after a system crash or during a normal re-boot when a log indicates that the LVM configuration process was interrupted during the last time of normal operation of the control station.

In FIG. 9, execution continues to the LVM configuration checking step 127 in response to the command invocation in step 116 or the automatic invocation in step 117. In step 128, if the configuration checking does not find an error, then the configuration checking task is finished, and execution returns to the command line interpreter (for the case of command invocation of the LVM check tool) or to the boot routine (for the case of automatic invocation during re-boot). In step 128, if the configuration checking finds an LVM error, then execution continues to the LVM recovery in step 129 so that the configuration errors are corrected and the LVM configuration information in the configuration database matches the LVM configuration information in the physical volume headers.

After the LVM recovery in step 129, execution returns to the command line interpreter (for the case of command invocation of the LVM check tool) or to the boot routine (for the case of automatic invocation during re-boot).

The administrator may also control granularity of the configuration checks to select checks at the global level, the logical volume level, the volume group level, or the physical volume level. For example, following is a listing the summary report of a check at the global level:

| #lvm_tool -check all | |
|---|---|
| LVM Version: | 1.1 |
| LVM Checksum: | OK |
| NAS Platform: | NS |
| CS Slot: | 0 |

| LOGICAL VOLUME | DIRECTORY | SIZE (MB) | MOUNT | STATUS |
|---|---|---|---|---|
| emc_lv_home | /home | 600 | YES | OK |
| emc_lv_celerra_backup | /celerra/backup | 840 | YES | OK |
| emc_lv_nbsnas_jserver | /nbsnas/jserver | 1416 | YES | OK |
| emc_lv_nas_jserver | /nas/jserver | 1416 | YES | OK |
| emc_lv_nas_var | /nas/var | 100 | YES | OK |
| emc_lv_nas_var_dump | /nas/var/dump | 1692 | NOT | OK |
| emc_lv_nas_var_auditing | /nas/var/auditing | 120 | YES | OK |
| emc_lv_nas_var_backup | /nas/var/backup | 840 | YES | OK |
| emc_lv_nas_var_emcsupport | /nas/var/emcsupport | 560 | YES | OK |
| emc_lv_nas_var_log | /nas/var/log | 212 | YES | OK |
| emc_lv_celerra_backendmo.. | /celerra/backendmoni.. | 8 | YES | OK |

Non-fatal errors detected:
Logical Volume "emc_lv_nas_var_dump" is not mounted
Logical Volume Summary:
emc_lv_home is ACTIVE, Mounted, OK
emc_lv_celerra_backup is ACTIVE, Mounted, OK
emc_lv_nbsnas_jserver is ACTIVE, Mounted, OK
emc_lv_nas_jserver is ACTIVE, Mounted, OK
emc_lv_nas_var is ACTIVE, Mounted, OK
emc_lv_nas_var_dump is ACTIVE, Not Mounted, OK
emc_lv_nas_var_auditing is ACTIVE, Mounted, OK
emc_lv_nas_var_backup is ACTIVE, Mounted, OK
emc_lv_nas_var_emcsupport is ACTIVE, Mounted, OK
emc_lv_nas_var_log is ACTIVE, Mounted, OK
emc_lv_celerra_backendmonitor is ACTIVE, Mounted, OK Following is a listing of the summary report of a check at the logical volume level:

| #/lvm_tool -check lv | | | | |
|---|---|---|---|---|
| LOGICAL VOLUME | DIRECTORY | SIZE (MB) | MOUNT | STATUS |
| emc_lv_home | /home | 600 | YES | OK |
| emc_lv_celerra_backup | /celerra/backup | 840 | YES | OK |
| emc_lv_nbsnas_jserver | /nbsnas/jserver | 1416 | YES | OK |
| emc_lv_nas_jserver | /nas/jserver | 1416 | YES | OK |
| emc_lv_nas_var | /nas/var | 100 | YES | OK |
| emc_lv_nas_var_dump | /nas/var/dump | 1692 | YES | OK |
| emc_lv_nas_var_auditing | /nas/var/auditing | 120 | YES | OK |
| emc_lv_nas_var_backup | /nas/var/backup | 840 | YES | OK |
| emc_lv_nas_var_emcsupport | /nas/var/emcsupport | 560 | YES | OK |
| emc_lv_nas_var_log | /nas/var/log | 212 | YES | OK |
| emc_lv_celerra_backendmo.. | /celerra/backendmoni.. | 8 | YES | OK |

Figure 10:
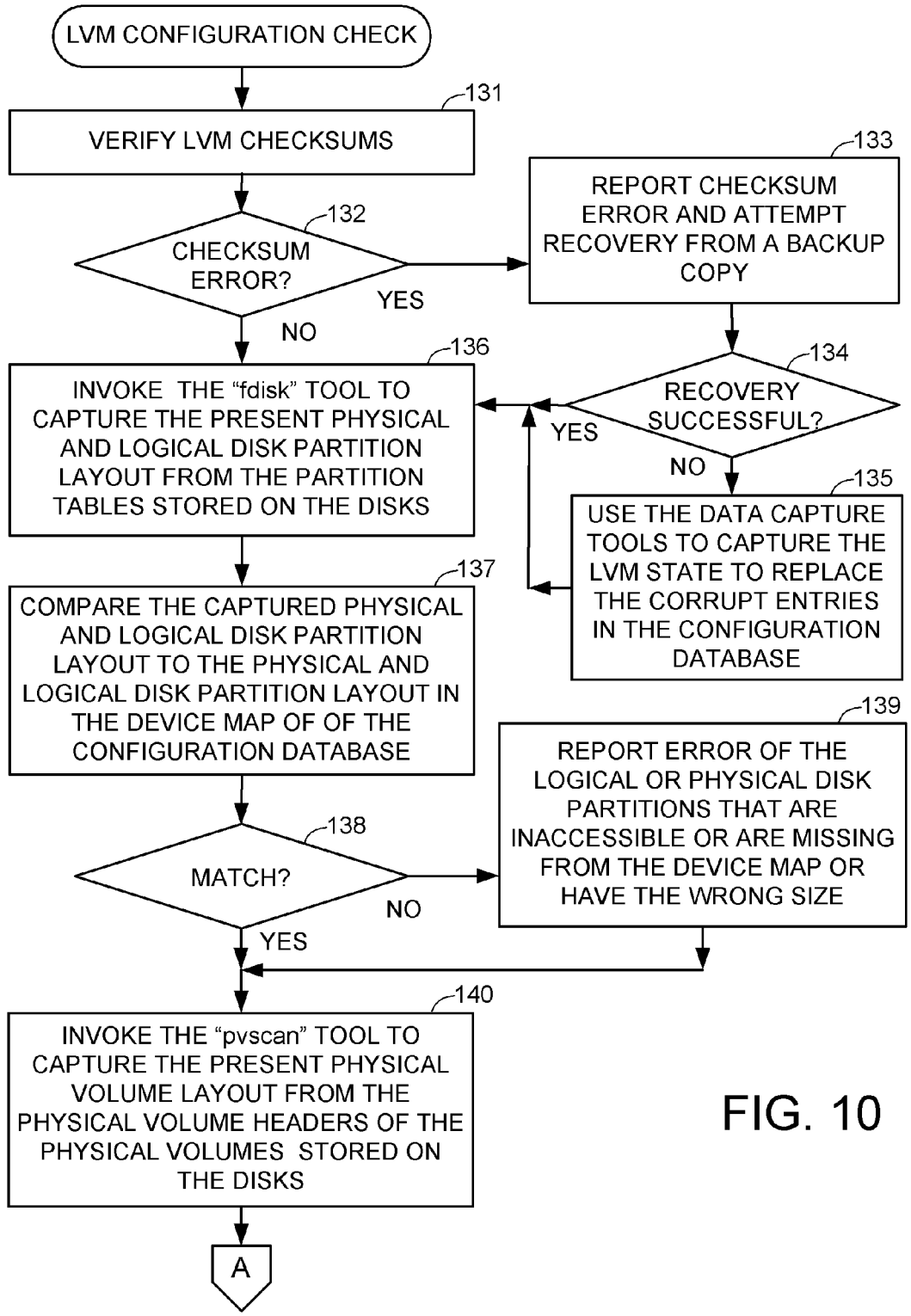
FIGS. 10, 11, and 12 together comprise a flowchart of a preferred procedure for checking the LVM configuration for errors.
Figure 11:
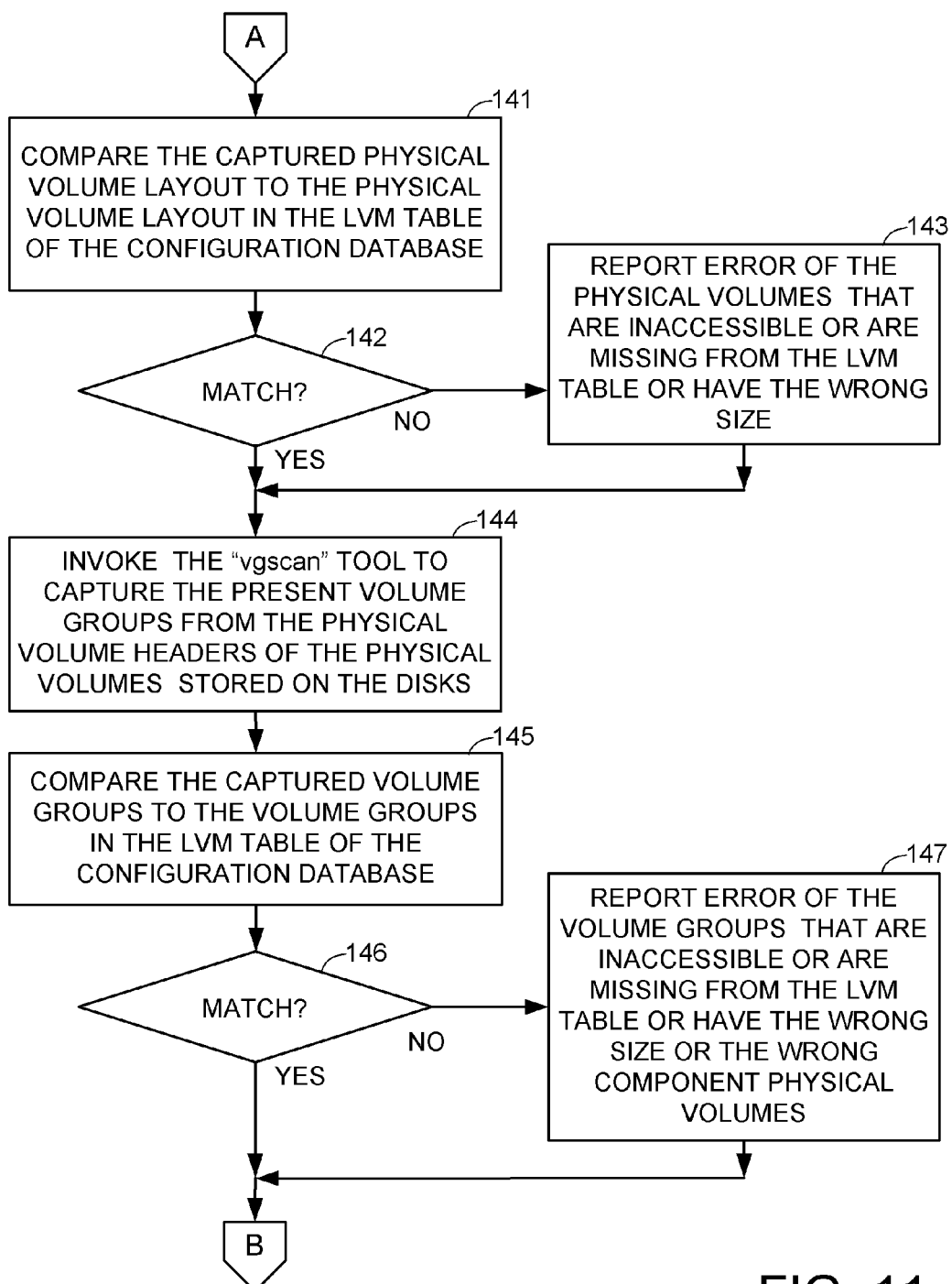
Figure 12:
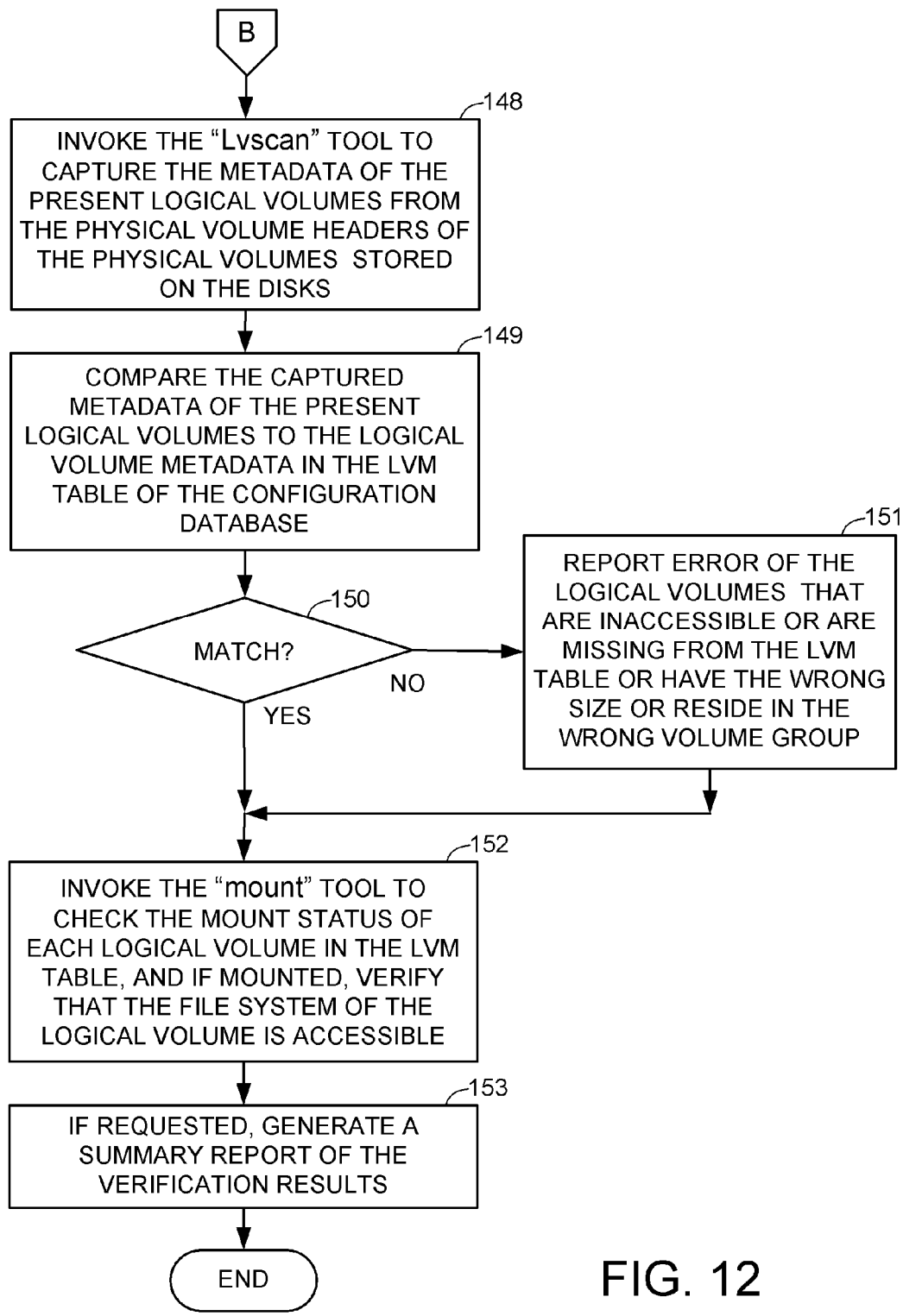

FIGS. 10, 11, and 12 show a preferred procedure for checking the LVM configuration for errors. In a first step 131, the checksums in the configuration database are verified. In step 132, if there is a checksum error, then execution branches to step 133. In step 133, the checksum error is logged or otherwise reported to the administrator, and an attempt is made to recover the corrupt entry in the configuration database from a backup copy of the configuration database. In step 134, if this recovery attempt is not successful, then execution continues to step 135 to use the data capture tools to capture the LVM state to replace the corrupt entry or entries in the configuration database. Execution continues from step 135 to step 136. Execution also continues to step 136 from step 132 if there was not a checksum error, and from step 134 if the recovery was successful.

In step 136, the "fdisk" tool is invoked to capture the present physical and logical disk partition layout from the partition tables stored on the disks. In step 137, the captured physical and logical disk partition layout is compared to the physical and logical disk partition layout in the device map of the configuration database. In step 138, if the captured physical and logical disk partition layout does not match the physical and logical disk partition layout in the device map of the configuration database, then execution branches to step 139 to report the error of the logical or physical disk partitions that are inaccessible or are missing from the device map or have the wrong size. The error is reported to the system administrator immediately in the case of command line execution or else written to a log for inspection (step 153 in FIG. 12). Execution continues from step 139 to step 140. Execution also continues from step 138 to step 140 if the captured physical and logical disk partition layout matches the physical and logical disk partition layout in the device map of the configuration database.

In step 140, the "pvscan" tool is invoked to capture the present physical volume layout from the physical volume headers of the physical volumes stored on the disks. Execution continues from step 140 to step 141 in FIG. 11. In step 141, the captured physical volume layout is compared to the physical volume layout in the LVM table of the configuration database. In step 142, if the captured physical volume layout does not match the physical volume layout in the LVM table of the configuration database, then execution branches to step 143 to report the error of the physical volumes that are inaccessible or are missing from the LVM table or have the wrong size. Execution continues from step 143 to step 144. Execution also continues from step 142 to step 144 if the captured physical volume layout matches the physical volume layout in the physical volume table of the configuration database.

In step 144, the "vgscan" tool is invoked to capture the present volume groups form the physical volume headers of the physical volumes stored on the disks. In step 145, the captured volume groups are compared to the volume groups in the LVM table of the configuration database. In step 146, if the captured volume groups do not match the volume groups in the LVM table, then execution branches to step 147 to report the error of the volume groups that are inaccessible or are missing from the volume group table or have the wrong size or the wrong component physical volumes. Execution continues from step 147 to step 148 in FIG. 12. Execution also continues from step 146 to step 148 if the captured volume groups match the volume groups in the LVM table.

In step 148 of FIG. 12, the "lvscan" tool is invoked to capture the metadata of the present logical volumes from the physical volume headers of the physical volumes stored on the disks. In step 149, the captured metadata of the present logical volumes is compared to the logical volume metadata in the LVM table of the configuration database. In step 150, if the captured metadata of the present logical volumes does not match the logical volume metadata in the LVM table, then execution branches to step 151 to report the error of the logical volumes that are inaccessible or are missing from the LVM table or have the wrong size or reside in the wrong volume group. Execution continues from step 151 to step 152. Execution also continues from 150 to step 152 if the captured metadata of the present logical volumes matches the logical volume metadata in the LVM table.

In step 152, the "mount" tool is invoked to check the status of each logical volume in the LVM table, and if mounted, to verify that the file system of the logical volume is accessible. Finally, in step 153, if requested, a summary report of the verification results is generated.

Figure 13:
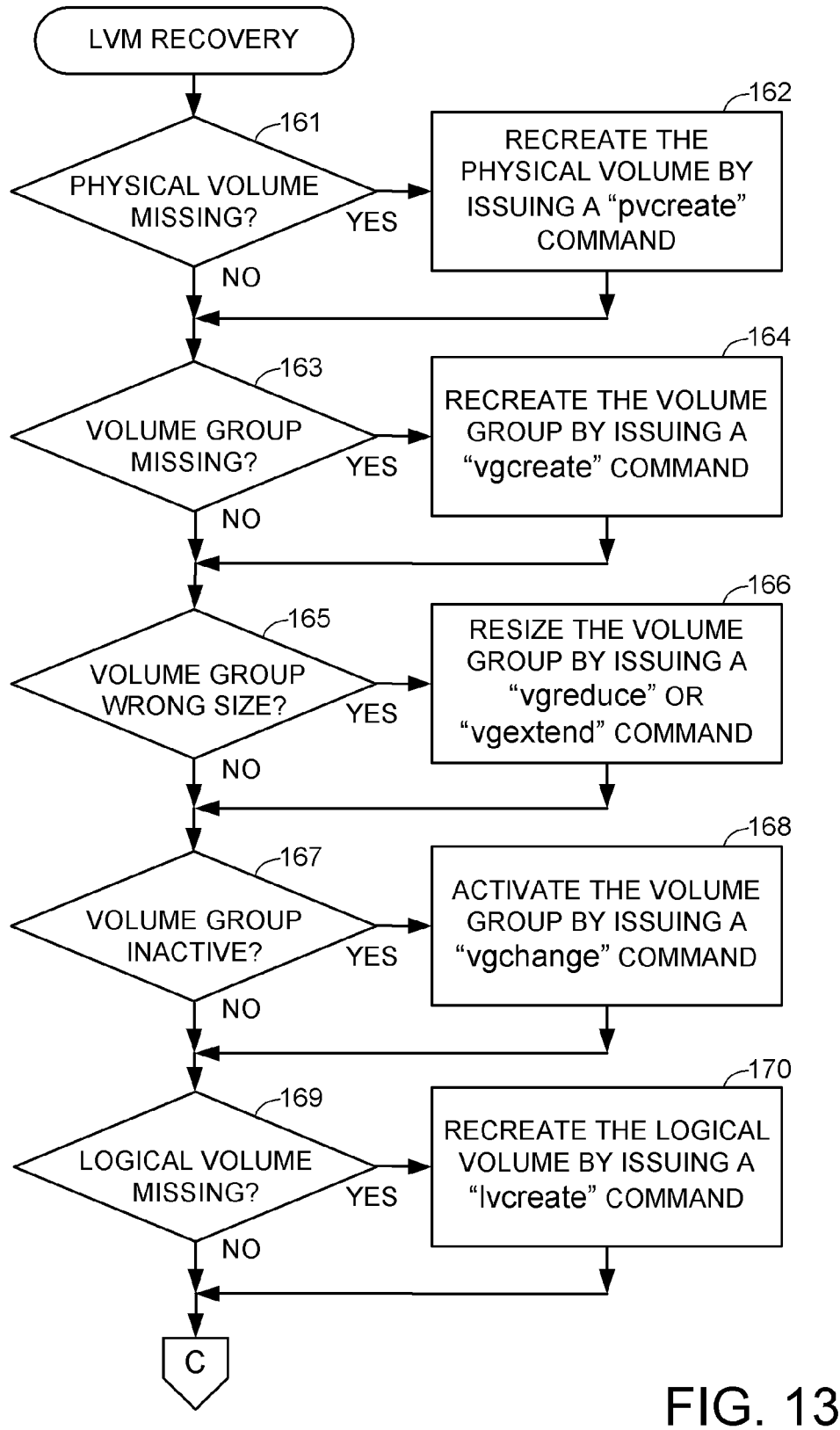
FIGS. 13, 14, and 15 together comprise a flowchart of a preferred procedure for recovering from errors in the LVM configuration.
Figure 14:
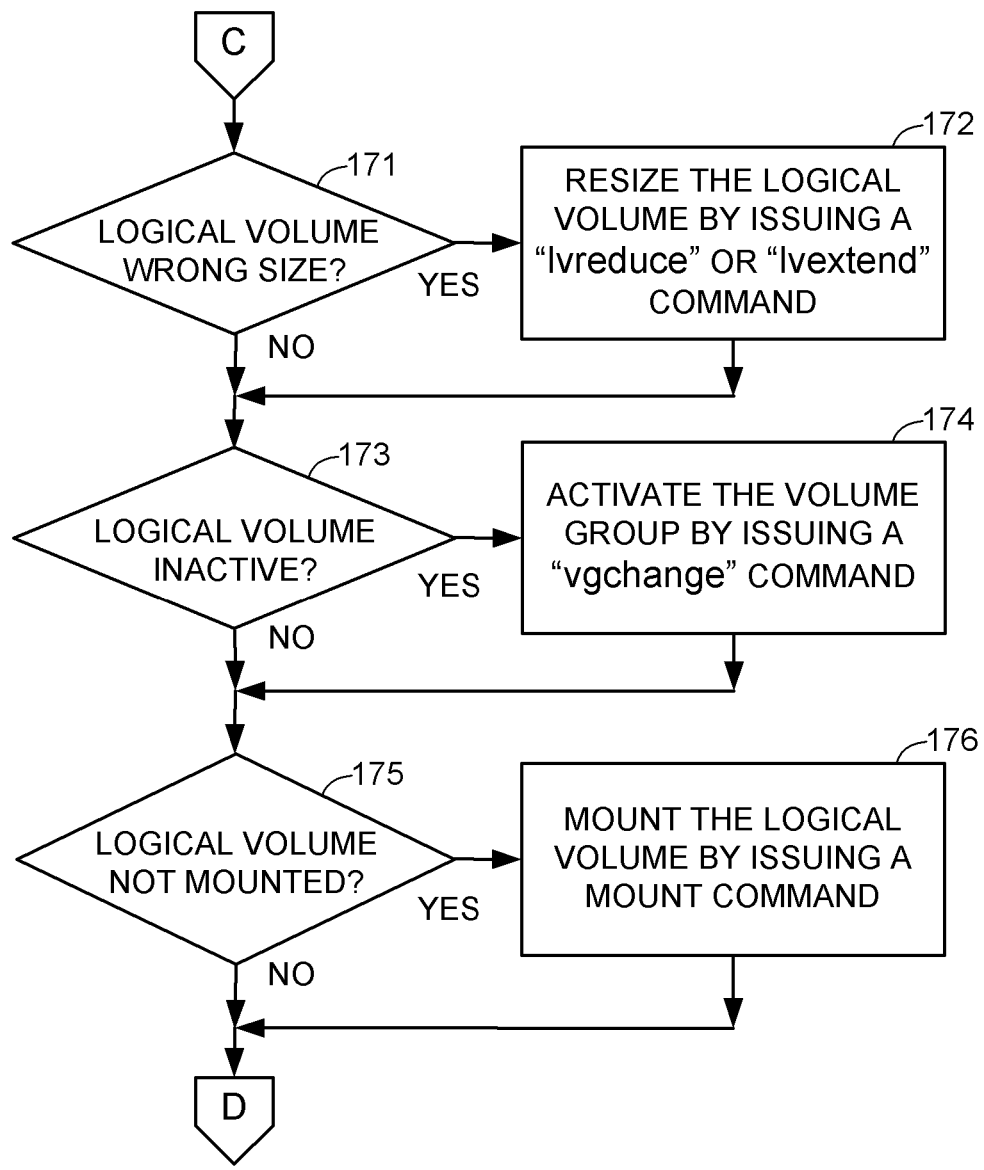
Figure 15:
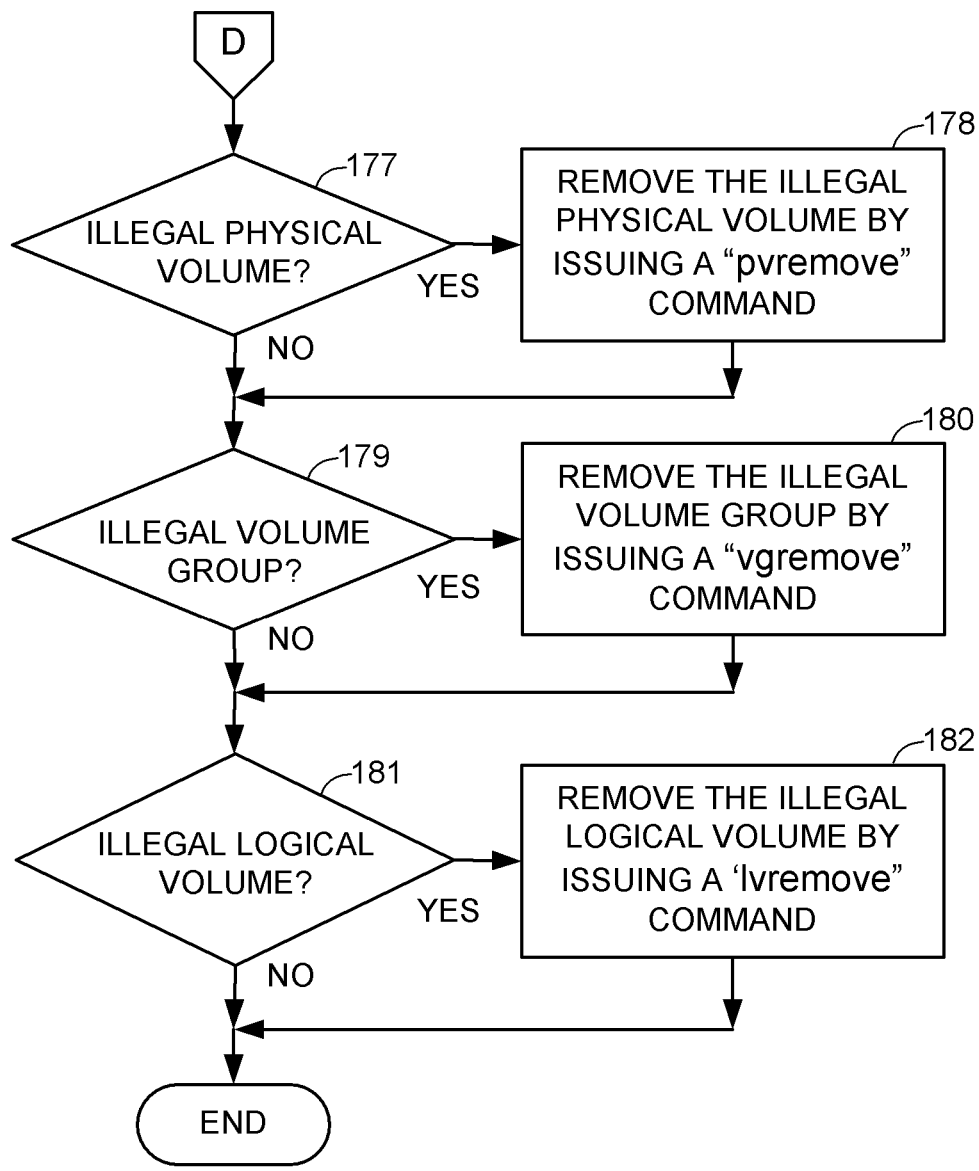

FIGS. 13, 14, and 15 together comprise a flowchart of a preferred tool for recovering from errors in the LVM configuration. In a first step 161 in FIG. 13, if a physical volume was found to be missing (for example, reported missing for physical volume in step 153 of FIG. 12), then execution branches to step 162. In step 162, the physical volume is re-created by issuing a "pvcreate" command. Execution continues from step 162 to step 163. Execution also continues from step 161 to step 163 if no physical volume was found to be missing.

In step 163, if a volume group was found to be missing (for example, reported missing for volume group in step 153 of FIG. 12), then execution branches to step 164. In step 164, the volume group is recreated by issuing a "vgcreate" command. Execution continues from step 164 to step 165. Execution also continues from step 163 to step 165 if no volume group was found to be missing.

In step 165, if a volume group was found to have a size mismatch error (for example, as reported in step 153 of FIG. 12), then execution branches to step 166 to re-size the volume group to the size in the LVM table by issuing a "vgreduce" or "vgextend" command. Execution branches from step 166 to step 167. Execution also branches from 165 to step 167 if no volume group was found to have a size mismatch error.

In step 167, if a volume group was found to be inactive (for example, as reported in step 153 of FIG. 12), then execution branches to step 168 to activate the volume group by issuing a "vgchange" command. Execution continues from step 168 to step 169. Execution also continues from step 167 to step 169 if none of the volume groups were found to be inactive.

In step 169, if a logical volume was found to be missing (for example, as reported in step 153 of FIG. 12), then execution branches to step 170 to recreate this missing logical volume by issuing a "lvcreate" command. Execution continues from step 170 (in FIG. 13) to step 171 (in FIG. 14). Execution also continues from step 169 (FIG. 13) to step 171 (FIG. 14) if no logical volume was found to be missing.

In step 171 of FIG. 14, if a logical volume was found to have a size mismatch (for example, as reported in step 153 of FIG. 12), then execution branches to step 172 to resize the logical volume to the size as listed in the LVM table by issuing a "lvreduce" or "lvextend" command. Execution continues from step 172 to step 173. Execution also continues from step 171 to step 173 if none of the logical volumes was found to have a size mismatch.

In step 173, if a logical volume listed in the LVM table was found to be inactive (for example, as reported in step 153 of FIG. 12), then execution branches to step 174. In step 174, the inactive logical volume is activated by issuing a "vgchange" command. Execution continues from step 174 to step 175. Execution also continues from step 173 to step 175 if none of the logical volumes was found to be inactive.

In step 175, if a logical volume was found to be not mounted (for example, as reported in step 153 of FIG. 12), then execution branches to step 176 to mount the logical volume by issuing a mount command. Execution continues from step 176 to step 177 in FIG. 15. Execution also continues from step 175 to step 177 if all of the logical volumes were found to be mounted.

In step 177 in FIG. 15, if there was found an illegal physical volume (i.e., a physical volume appearing in the header of a logical or physical disk but not listed in the LVM table), for example as reported in step 153 of FIG. 12, then execution branches to step 178 to remove the illegal physical volume by issuing a "pvremove" command. Execution continues from step 178 to step 179. Execution also continues from step 177 to step 179 if no illegal physical volume was found in the storage system.

In step 179, if there was found an illegal volume group (i.e., a volume group appearing in the header of a logical or physical disk but not listed in the LVM table), for example as reported in step 153 of FIG. 12, then execution branches to step 180 to remove the illegal volume group by issuing a "vgremove" command. Execution continues from step 180 to step 181. Execution also continues from step 179 to step 181 if no illegal volume group was found in the storage system.

In step 181 in FIG. 15, if there was found an illegal logical volume (i.e., a logical volume appearing in the header of a logical or physical disk but not listed in the LVM table), for example as reported in step 153 in FIG. 12, then execution branches to step 182 to remove the illegal logical volume by issuing a "lvremove" command. Execution is finished after step 182. Execution also is finished after step 181 if no illegal physical volume was found in the storage system.

As will be appreciated by one skilled in the art, aspects of the present invention may be embodied in a system, method or computer program product. Accordingly, aspects of the present invention may take the form of an entirely hardware embodiment, an entirely software embodiment (including firmware, resident software, micro-code, etc.) or an embodiment combining software and hardware. Furthermore, aspects of the present invention may take the form of a computer program product embodied in one or more computer readable medium(s) having computer readable program code embodied thereon. Any combination of one or more computer readable medium(s) may be utilized. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: a portable computer diskette, a hard disk, a random access memory (PAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the above, errors arising in logical volume partitions are detected and corrected automatically well before the errors cause a failure to access data in the logical volumes. A configuration database is created of configuration information about the logical volume partitions defined in headers of physical volumes, and the configuration database is stored in storage separate from the headers of the physical volumes.

Thereafter the errors are detected by capturing configuration information about the logical volume partitions from the headers of the physical volumes, and comparing the captured configuration information to the configuration information in the configuration database. Upon detecting the configuration errors, the configuration errors are automatically corrected in the corrupt headers of the physical volumes. If requested, a summary report is generated of logical volumes, physical volumes, and disk partitions that are inaccessible or missing from the configuration database or have the wrong size. The configuration check and restore is performed periodically as a background task and during a re-boot after a system crash or interruption of a configuration process or when invoked prior to a recovery install or database restore.

What is claimed is:

1. A method of configuring logical volumes in a data storage system, the logical volumes being contained in volume groups of physical volumes of storage in the data storage system, the logical volumes and volume groups being defined in headers of the physical volumes, said method comprising a data processor of the data storage system executing computer instructions stored on a non-transitory computer readable storage medium to perform the steps of:

(a) creating a configuration database of configuration information about the physical volumes, volume groups, and logical volumes defined in the headers of the physical volumes, and storing the configuration database in storage separate from the physical headers of the physical volumes; and thereafter (b) checking the configuration of the physical volumes, volume groups, and logical volumes in the volume headers by capturing configuration information about the physical volumes, volume groups, and logical volumes from the headers of the physical volumes, and comparing the captured configuration information to the configuration information about the physical volumes, volume groups, and logical volumes in the configuration database to detect a configuration error in at least one of the headers of the physical volumes; and (c) upon detecting the configuration error in said at least one of the headers of the physical volumes, automatically correcting the configuration error in said at least one of the headers of the physical volumes;

which includes performing step (b) automatically during a re-boot of the storage system to recover from a crash of the storage system.

2. A method of configuring logical volumes in a data storage system, the logical volumes being contained in volume groups of physical volumes of storage in the data storage system, the logical volumes and volume groups being defined in headers of the physical volumes, said method comprising a data processor of the data storage system executing computer instructions stored on a non-transitory computer readable storage medium to perform the steps of:

(a) creating a configuration database of configuration information about the physical volumes, volume groups, and logical volumes defined in the headers of the physical volumes, and storing the configuration database in storage separate from the physical headers of the physical volumes; and thereafter (b) checking the configuration of the physical volumes, volume groups, and logical volumes in the volume headers by capturing configuration information about the physical volumes, volume groups, and logical volumes from the headers of the physical volumes, and comparing the captured configuration information to the configuration information about the physical volumes, volume groups, and logical volumes in the configuration database to detect a configuration error in at least one of the headers of the physical volumes; and (c) upon detecting the configuration error in said at least one of the headers of the physical volumes, automatically correcting the configuration error in said at least one of the headers of the physical volumes;

which includes performing step (b) automatically during a re-boot of the storage system upon finding that there was an interruption in an uncompleted process of configuring a physical volume, volume group, or logical volume.

3. A method of configuring logical volumes in a data storage system, the logical volumes being contained in volume groups of physical volumes of storage in the data storage system, the logical volumes and volume groups being defined in headers of the physical volumes, said method comprising a data processor of the data storage system executing computer instructions stored on a non-transitory computer readable storage medium to perform the steps of:

(a) creating a configuration database of configuration information about the physical volumes, volume groups, and logical volumes defined in the headers of the physical volumes, and storing the configuration database in storage separate from the physical headers of the physical volumes; and thereafter (b) checking the configuration of the physical volumes, volume groups, and logical volumes in the volume headers by capturing configuration information about the physical volumes, volume groups, and logical volumes from the headers of the physical volumes, and comparing the captured configuration information to the configuration information about the physical volumes, volume groups, and logical volumes in the configuration database to detect a configuration error in at least one of the headers of the physical volumes; and (c) upon detecting the configuration error in said at least one of the headers of the physical volumes, automatically correcting the configuration error in said at least one of the headers of the physical volumes;

wherein step (a) further includes storing, in the configuration database, logical or physical disk partition information about logical or physical disk partitions defined in partition tables of logical or physical drives in the storage system and step (b) further includes detecting an error in at least one of the logical or physical disk partitions by capturing logical or physical disk partition information from the partition tables of the logical or physical drives in the storage system and comparing the captured logical or physical disk partition information to the logical or physical disk partition information in the configuration database, and step (c) further includes, upon detecting said error in said at least one of the logical or physical disk partitions, correcting the error in said at least one of the logical or physical disk partitions; and wherein step (b) further includes generating a report of logical or physical disk partitions that are inaccessible, logical or physical disk partitions that are missing from the configuration database, and logical or physical disk partitions that have a size that is wrong.

4. A method of configuring logical volumes in a data storage system, the logical volumes being contained in volume groups of physical volumes of storage in the data storage system, the logical volumes and volume groups being defined in headers of the physical volumes, said method comprising a data processor of the data storage system executing computer instructions stored on a non-transitory computer readable storage medium to perform the steps of:
- (a) creating a configuration database of configuration information about the physical volumes, volume groups, and logical volumes defined in the headers of the physical volumes, and storing the configuration database in storage separate from the physical headers of the physical volumes; and thereafter
- (b) checking the configuration of the physical volumes, volume groups, and logical volumes in the volume headers by capturing configuration information about the physical volumes, volume groups, and logical volumes from the headers of the physical volumes, and comparing the captured configuration information to the configuration information about the physical volumes, volume groups, and logical volumes in configuration database to detect a configuration error in at least one of the headers of the physical volumes; and
- (c) upon detecting the configuration error in said at least one of the headers of the physical volumes, automatically correcting the configuration error in said at least one of the headers of the physical volumes;
- wherein step (b) further includes generating a report of logical volumes that are inaccessible, logical volumes that are missing from the configuration database, and logical volumes that have a size that is wrong.

5. A computer program product comprising non-transitory computer readable storage medium storing computer instructions, wherein the computer instructions, when executed by a data processor of a data storage system, perform the steps of:
- (a) creating a configuration database of configuration information about the physical volumes, volume groups, and logical volumes defined in the headers of the physical volumes, and storing the configuration database in storage separate from the physical headers of the physical volumes; and thereafter
- (b) checking the configuration of the physical volumes, volume groups, and logical volumes in the volume headers by capturing configuration information about the physical volumes, volume groups, and logical volumes from the headers of the physical volumes, and comparing the captured configuration information to the configuration information about the physical volumes, volume groups, and logical volumes in the configuration database to detect a configuration error in at least one of the headers of the physical volumes; and
- (c) upon detecting the configuration error in said at least one of the headers of the physical volumes, automatically correcting the configuration error in said at least one of the headers of the physical volumes;
- wherein step (a) further includes storing, in the configuration database, logical or physical disk partition information about logical or physical disk partitions defined in partition tables of logical or physical drives in the storage stem and step (b) further includes detecting an error in at least one of the logical or physical disk partitions by capturing logical or physical disk partition information from the partition tables of the logical or physical drives in the storage system and comparing the captured logical or physical disk partition information to the logical or physical disk partition information in the configuration database, and step (c) further includes, upon detecting said error in said at least one of the logical or physical disk partitions, correcting the error in said at least one of the logical or physical disk partitions; and
- wherein step (b) further includes generating a report of logical or physical disk partitions that are inaccessible, logical or physical disk partitions that are missing from the configuration database, and logical or physical disk partitions that have a size that is wrong.

6. A computer program product comprising non-transitory computer readable storage medium storing computer instructions, wherein the computer instructions, when executed by a data processor of a data storage system, perform the steps of:
- (a) creating a configuration database of configuration information about the physical volumes, volume groups, and logical volumes defined in the headers of the physical volumes, and storing the configuration database in storage separate from the physical headers of the physical volumes; and thereafter
- (b) checking the configuration of the physical volumes, volume groups, and logical volumes in the volume headers by capturing configuration information about the physical volumes, volume groups, and logical volumes from the headers of the physical volumes, and comparing the captured configuration information to the configuration information about the physical volumes, volume groups, and logical volumes in the configuration database to detect a configuration error in at least one of the headers of the physical volumes; and
- (c) upon detecting the configuration error in said at least one of the headers of the physical volumes automatically correcting the configuration error in said at least one of the headers of the physical volumes;
- wherein step (b) further includes generating a report of logical volumes that are inaccessible, logical volumes that are missing from the configuration database, and logical volumes that have a size that is wrong.

7. A data storage system comprising:
back-end data storage devices;
data mover computers coupled to the back-end data storage devices for moving data between the back-end data storage devices and network clients; and
a control station computer coupled to the data mover computers for configuring and controlling the data storage system, wherein the control station computer includes a data processor and non-transitory computer readable storage medium stormy program instructions that, when executed by the data processor, perform the steps of:
- (a) creating a configuration database of configuration information about physical volumes, volume groups, and logical volumes defined in headers of physical volumes in the back-end data storage devices, and storing the configuration database in storage separate from the headers of the physical volumes; and thereafter
- (b) checking the configuration of the physical volumes, volume groups, and logical volumes in the volume headers by capturing configuration information about the physical volumes, volume groups, and logical volumes from the headers of the physical volumes, and comparing the captured configuration information to the configuration information about the physical volumes, volume groups, and logical volumes in the configuration database to detect a configuration error in at least one of the headers of the physical volumes; and
- (c) upon detecting the configuration error in said at least one of the headers of the physical volumes automatically correcting the configuration error in said at least one of the headers of the physical volumes;
- wherein the step (a) further includes storing, in the configuration database, logical or disk partition information about logical or physical disk partitions defined in partition tables of logical or physical drives in the storage stem and step (b) further includes detecting an error in at least one of the logical or physical disk partitions by capturing logical or physical disk partition information from the partition tables of the logical or physical drives in the storage system and comparing the captured logical or physical disk partition information to the logical or physical disk partition information in the configuration database, and step (c) further includes, upon detecting said error in said at least one of the logical or physical disk partitions, correcting the error in said at least one of the logical or physical disk partitions; and wherein step (b) further includes generating a report of logical or physical disk partitions that are inaccessible, logical or physical disk partitions that are missing from the configuration database, and logical or physical disk partitions that have a size that is wrong.

8. A data storage system comprising:

back-end data storage devices;

data mover computers coupled to the back-end data storage devices for moving data between the back-end data storage devices and network clients; and a control station computer coupled to the data mover computers for configuring and controlling the data storage system, wherein the control station computer includes a data processor and non-transitory computer readable storage medium storing program instructions that, when executed by the data processor, perform the steps of:

(a) creating a configuration database of configuration information about physical volumes, volume groups, and logical volumes defined in headers of physical volumes in the back-end data storage devices and storing the configuration database in storage separate from the headers of the physical volumes; and thereafter (b) checking the configuration of the physical volumes, volume groups, and logical volumes in the volume headers by capturing configuration information about the physical volumes, volume groups, and logical volumes from the headers of the physical volumes, and comparing the captured configuration information to the configuration information about the physical volumes, volume groups, and logical volumes in the configuration database to detect a configuration error in at least one of the headers of the physical volumes; and (c) upon detecting the configuration error in said at least one of the headers of the physical volumes, automatically correcting the configuration error in said at least one of the headers of the physical volumes;

wherein the step (b) further includes generating a report of logical volumes that are inaccessible, logical volumes that are missing from the configuration database, and logical volumes that have a size that is wrong.

* * * * *